United States Patent [19]

Macheras et al.

[11] Patent Number: 5,443,728
[45] Date of Patent: Aug. 22, 1995

[54] METHOD OF PREPARING MEMBRANES FROM BLENDS OF POLYETHERIMIDE AND POLYIMIDE POLYMERS

[75] Inventors: James T. Macheras, Quincy; Benjamin Bikson, Brookline; Joyce K. Nelson, Lexington, all of Mass.

[73] Assignee: Praxair Technology, Inc., Danbury, Conn.

[21] Appl. No.: 234,037

[22] Filed: Apr. 28, 1994

[51] Int. Cl.⁶ .............................................. B01D 69/08
[52] U.S. Cl. .......................... 210/500.23; 210/500.39
[58] Field of Search ................... 210/500.23, 500.39; 95/54, 55; 96/14

[56] References Cited

U.S. PATENT DOCUMENTS

| | | | |
|---|---|---|---|
| 4,214,020 | 7/1980 | Ward et al. | 40/490 X |
| 4,440,643 | 4/1984 | Makino et al. | 201/500.2 |
| 4,460,526 | 7/1984 | Makino et al. | 264/41 |
| 4,512,893 | 4/1985 | Makino et al. | 210/500.2 |
| 4,528,004 | 7/1985 | Makino et al. | 55/158 |
| 4,673,418 | 6/1987 | Peinemann | 55/158 |
| 4,818,452 | 4/1989 | Kneifel et al. | 264/41 |
| 4,832,713 | 5/1989 | Yamada et al. | 55/158 |
| 4,933,085 | 6/1990 | Kneifel et al. | 210/500.39 |
| 5,015,270 | 5/1991 | Ekiner et al. | 55/16 |
| 5,061,298 | 10/1991 | Burgoyne, Jr. et al. | 55/16 |
| 5,067,970 | 11/1991 | Wang et al. | 55/16 |
| 5,085,676 | 2/1992 | Ekiner et al. | 55/158 |
| 5,248,319 | 9/1993 | Ekiner et al. | 95/54 |

OTHER PUBLICATIONS

"Development of asymmetric hollow fibers from polyimides for air separation", T. S. Chung et al, Journal of Membrane Science, 75 (1992) pp. 181–195.

"Preparation of hollow fiber membranes from polyetherimide for gas separation" Kneifel, et al, Journal of Membrane Science, 65 (1992) pp. 295–307.

Primary Examiner—Frank Spear
Attorney, Agent, or Firm—Alvin H. Fritschler

[57] ABSTRACT

Improved fluid separation membranes are prepared from the blends of polyetherimide with phenylindane containing polyimides, wherein the amount of phenylindane containing polyimide in the blend is low. The present invention provides for highly anisotropic membranes particularly useful for gas separation applications and for preparation of composite membranes thereof.

19 Claims, No Drawings

METHOD OF PREPARING MEMBRANES FROM BLENDS OF POLYETHERIMIDE AND POLYIMIDE POLYMERS

FIELD OF THE INVENTION

This invention describes preparation of improved membranes for fluid separations from blends of polyetherimide and phenylindane containing polyimide polymers. It was found that membranes fabricated from these blends were particularly useful for gas separations and exhibited unexpectedly good gas separation properties.

BACKGROUND OF THE INVENTION

Preparation of polymeric membranes for fluid and gas separation applications are well documented in the art. In order for a polymer to qualify as a suitable membrane forming and fluid separation material, it must meet several performance criteria that will depend on the end use of the membrane. Among the factors that will influence the choice of a polymer are its mechanical strength, chemical resistance, thermal stability, and most importantly its separation and permeation characteristics. In addition to the aforementioned considerations, it is frequently preferred that a prospective membrane polymer be commercially available at a moderate cost.

Polysulfones are materials that frequently meet these requirements. Israel Cabasso documents techniques for making polysulfone membranes in the form of hollow fibers in. "Hollow Fiber Membranes", Kirk-Othmer Encyclopedia of Chemical Technology, 12, Third Edition, 492–519 (1980), and "Membranes", Encyclopedia of Polymer Science and Engineering, 9, Second Edition, 509–579 (1987). Polysulfone membranes are described extensively in the literature and are used in many commercial fluid and gas separation applications. However, there are applications in which the use of a polysulfone membrane would be unsuitable. These applications often require operating conditions that exceed the chemical, mechanical, or thermal properties of polysulfone membranes. The fluid separation characteristics of polysulfone membranes, in particular the gas separation and permeation characteristics of polysulfones, are frequently limited. These higher performance requirements are frequently met by polyimide membranes.

Polyimides frequently exhibit exceptionally good thermal resistance as well as chemical and mechanical properties that exceed those of polysulfone. Advanced performance polyimides are expensive, and consequently their use as membrane materials is often limited. One polyimide based material that can be used economically is Ultem ® 1000, a polyetherimide manufactured by General Electric. This polyetherimide polymer is of interest as a membrane forming material because of its superior strength and chemical resistance.

The manufacture of integral asymmetric polyetherimide membranes is taught by Peinemann in U.S. Pat. No. 4,673,418. Kneifel et al. in U.S. Pat. Nos. 4,818,452 and 4,933,085 describe processes for making polyetherimide hollow fiber membranes capable of separating liquid or gaseous mixtures. Kneifel and Peinemann further report the utility of polyetherimide hollow fiber gas separation membranes in an article in the Journal of Membrane Science, 65 (1992), 295–307.

There are numerous references in the literature to membranes manufactured from polyimides. Makino et al. teach preparation of several specially polyimides and membranes produced therefrom in U.S. Pat. Nos. 4,440,643; 4,460,526; 4,512,893; and 4,528,004. Chung et al. describe preparation of asymmetric hollow fibers for gas separation from fluorine containing polyimides in the Journal of Membrane Science, 75 (1992), 181–195. This work is an example of a gas separation membrane fabricated from an expensive, custom synthesized polymer.

Another material with advantageous properties is a polyimide that incorporates phenylindane moieties in the polymer chains. This polymer is sold by Ciba Geigy under the trade name of Matrimid ® 5218. This material has a good combination of gas permeability coefficients and separation factors for many gas pairs. The fabrication of asymmetric membranes from this polyimide has been reported by Wang et al. in U.S. Pat. No. 5,067,970. Ekiner et al. disclose the use of phenylindane containing polyimides to prepare gas separation membranes in U.S. Pat. No. 5,015,270. While membranes described in the aforementioned patents display good gas separation characteristics, commercial use of these membranes can be limited because of the high cost of this specialty polymer. These specialty polymers are frequently chosen as membrane materials because of their enhanced ability to separate gases. The improved performance can manifest itself in the form of higher permeation rate for a particular gas or an increased separation factor for one or more pair of gases. The polyetherimide polymer Ultem ® 1000 has good intrinsic separation factors for many gas pairs including $O_2/N_2$ and $CO_2/CH_4$; however, the fast gas permeation rates for this polymer are low. Thus, there continues to be a need to improve gas permeation characteristics of polyimide based membrane systems in an economical manner.

One approach that has been disclosed in the art to fill this need is the coextrusion process. To minimize the amount of specialty polymer used in membrane preparation, hollow fibers have been prepared by this process with an inner core and an outer sheath that consists of two different materials. The core, which typically constitutes the majority of the fiber volume, is composed of a polymer that merely acts as a porous support for the sheath polymer. Thus, the core material may be selected from any number of common polymers with adequate mechanical and thermal characteristics. The separation layer of the membrane is formed by the sheath polymer with optimal separation/permeation characteristics that preferably make up only a fraction of the fiber volume. Tsujii et al. in Japanese Patent Application Sho61-32261 employ a coextrusion process to produce gas separation membranes from a variety of polymers including cellulose esters. Kusuki et al. in Japanese Patent Application Sho62-253785 report preparation of polyimide gas separation membranes by coextrusion. The use of phenylindane containing polyimides as the sheath layer in a coextruded hollow fiber is reported by Ekinr et al. in U.S. Pat. No. 5,085,676. Example 40 of this patent further discloses the use of Ultem ® 1000/Matrimid ® 5218 blend in 75:25 weight ratio as the core layer in coextruded hollow fibers. It is stated that the blend is used to promote adhesion between the core and sheath layers but does not act as a separation material. The polymer blend core layer does not contain an integral discriminating layer and serves only as a support for the sheath layer. The use of Ultem/Matrimid blend in 90:10 weight ratio as a core layer in coextruded hollow fibers is further disclosed in U.S. Pat. No. 5,248,319. The use of polyetherimide/phenylindane containing polyimide blend as an integral asymmetric gas separation membrane is disclosed by Ekiner and Simmons in U.S. Pat. No. 5,248,319. Ultem/Matrimid polymer blends of 75:25 ratio are spun into integral asymmetric hollow fibers (comparative example 1, column 12). The Ultem/Matrimid polymer blend ratio utilized by Ekiner and Simmons is relatively high to be attractive economically due to the high cost of Matrimid polymer, and furthermore, the utility of this blend to prepare membranes with integral discriminating layers of superior separation/permeation performance is not recognized. The permeation properties of hollow fiber membranes prepared from Ultem/Matrimid blend were referred to as not being attractive (column 13, lines 1 through 5).

There are numerous additional examples in the art of fluid separation membranes advantageously prepared from blends of polymers. Kraus et al. in U.S. Pat. No. 5,076,935 teach the use of polyethersulfone/phenoxy resin blends to make porous isotropic membranes. Nunes et al. in the Journal of Membrane Science, 73 (1992), 25–35, describe the preparation of asymmetric membranes useful for ultrafiltration from blends of polyvinylidene fluoride and polymethyl methacrylate. The practice of blending polymers has also been used effectively in the formation of gas separation membranes. Burgoyne, Jr. et al. in U.S. Pat. No. 5,061,298 disclose the use of blends of polyimide polymers as part of a process to prepare air separation membranes as shown. Yamada et al. in U.S. Pat. No. 4,832,713 disclose fabrication of gas separation membranes from blends of polyetherimide mixed with materials such as polycarbonates or polysulfones. However, the prior art does not disclose preparation of integral asymmetric fluid separation membranes with superior combination of separation/permeation characteristics from blends of polyetherimide and phenylindane containing polyimides wherein the amount of phenylindane containing polyimide polymer in the blend is low or the use of such blends for preparation of porous substrates useful in the manufacture of composite membranes by solution coating processes.

The approaches disclosed in the prior art to produce polyimide membranes in an expedient and economical manner have been somewhat deficient. Coextrusion takes significant steps in correcting prior art deficiencies, but is a cumbersome process requiring substantial investment in specialized hardware such as spinnerettes. Furthermore, coextrusion processes can consume significant amounts of the separation layer polymer since it must: completely encircle the core polymer at a thickness capable of promoting the integrity of the separating surface. Thus, there still remains a need for preparation of improved fluid separation membranes from polyimide polymers.

SUMMARY OF THE INVENTION

It is an object of present invention to provide an improved fluid separation membrane from blends of polyetherimide and phenylindane containing polyimide polymers wherein the ratio of phenylindane containing polyimide to polyetherimide is low and wherein the membrane is an anisotropic membrane with a discriminating membrane layer that is less than about 1000 Å thick.

It is another object of this invention to provide an improved anisotropic substrate for the preparation of composite membranes.

Other features and advantages of the present invention will become apparent from the following description of the invention.

DETAILED DESCRIPTION OF THE INVENTION

It has been discovered unexpectedly that blends of polyetherimide and phenylindane containing polyimides of high weight ratios can be fabricated into membranes of superior separation performance. These membranes can be useful for microfiltration and ultrafiltration of fluids, but are particularly useful for gas separation applications. The preferred polyetherimide polymer is Ultem ® 1000, manufactured by General Electric Company, that has the following repeat unit:

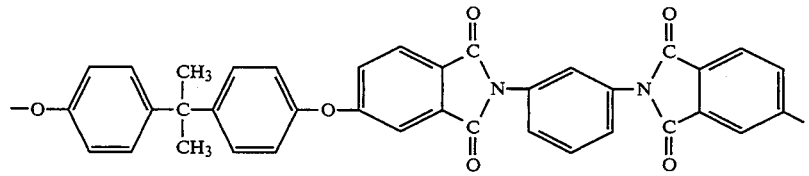

The preferred phenylindane containing polymer is Matrimid ® 5218 manufactured by Ciba Geigy that has the following repeat unit:

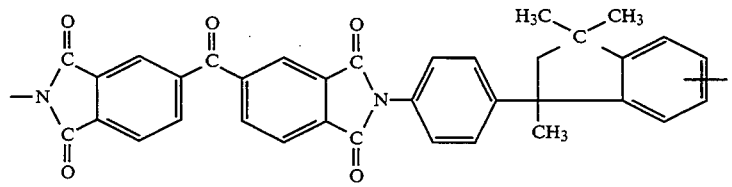

Membranes of this invention are desirably prepared by solution casting methods. Thus, the polyetherimide and phenylindane containing polyimide must be blended in specific weight ratios and dissolved in a common membrane forming solution. Such solutions are commonly known in the art as casting solutions or dopes. The solutions of this invention, in addition to two membrane forming polymers, will contain solvent and nonsolvent components. The membrane casting process typically involves a solidification step in which the membrane forming solution is coagulated by bringing it in contact with a nonsolvent or a solvent/nonsolvent mixture. It is desirable that the solvent components of the membrane forming solution are miscible in the coagulation media. Thus, if the coagulation media is aqueous in nature, then water miscible solvents may be advantageously employed in the preparation of the membrane forming solutions of this invention. Preferred solvents include dimethyl acetamide and N-methyl pyrrolidone, and their mixture with strong swelling agents such as dimethyl formamide, gamma butyrolactone, and dimethyl sulfoxide. The nonsolvent components that are used to formulate the membrane forming solution may be solids or liquids. These components are useful in controlling solution viscosity as well as the porosity and other membrane properties. Typical of the nonsolvents that are useful in formulating membrane casting solutions are aliphatic alcohols, particularly polyhydric alcohols such as ethylene glycol, glycerine, etc., polyethylene oxides and polypropylene oxides; surfactants such as alkylaryl polyether alcohols, alkylaryl sulfates, alkyl sulfates, etc.; triethylphosphate; formamide; aliphatic acids such as acetic or propionic acid, etc.; and salts such as zinc chloride, lithium chloride, etc.

Membranes can be cast from an appropriate polymer blend solution by a variety of methods. Preferred methods are dry/wet or wet/wet phase inversion processes. Such methods can be used to produce membranes in any desired configuration such as flat sheet, tubular or spiral wound configuration, but it is preferred to form the membranes of this invention in the form of hollow fibers. In a preferred embodiment of this invention, the membranes are spun into hollow fiber configuration by the process described by Bikson et al. in U.S. Pat. No. 5,181,940. This patent teaches a method of producing highly anisotropic hollow fibers useful as permselective gas separation membranes and as substrates for preparation of composite membranes by extruding a spinning solution through a tube-in-orifice spinnerette into a gas filled chamber maintained at reduced pressure followed by a coagulation and solidification step. Spinning solutions formulated from blends of polyetherimide and phenylindane containing polyimides can be advantageously spun into hollow fibers utilizing this spinning method. It has been found, surprisingly, that only minor amounts of phenylindane containing polyimide in the spinning solution formulation are required to effect significant improvements in the spinability of the solutions and to produce hollow fiber membranes with substantially improved fluid separation characteristics. The ratio of phenylindane containing polymer to polyetherimide polymer is typically less than 0.2, preferably less than 0.1, and most preferably from 0.08 to 0.02. In some embodiments, the ratio may be as low as 0.01 or less.

The distinguishing feature of the blend membranes of the present invention is the fact that they are anisotropic and contain an integral discriminating layer. This layer is less than 1000 Å thick, preferably less than 500 Å thick, most preferably less than 250 Å thick. The discriminating layer is distinguishable from the main membrane body by somewhat decreased porosity (i.e., increased density) and/or decreased pore size. The porosity of the discriminating layer (porosity is defined as the ratio of the area occupied by pores to the total area of the discriminating layer) will vary from about $4 \times 10^{-2}$ to below $10^{-5}$-$10^{-6}$. Low porosity is most desirable for integral asymmetric membranes, in particular integral asymmetric gas separation membranes, while high levels of surface porosity are particularly useful for preparation of composite gas separation membranes. The discriminating layer is typically located at the exterior membrane surface. Membranes in hollow fiber form may contain the discriminating layer at the exterior or the interior wall. It is also possible for the discriminating layer to be located in the interior of the membrane, preferably close to membrane surface.

The membranes of this invention are highly anisotropic and can be prepared with very thin discriminating layers preferably less than 250 Å thick. Discriminating layer thicknesses of these magnitudes can be advantageously achieved by the aforementioned vacuum spinning technique. The hollow fiber wall morphology and the thickness of membrane discriminating layer can be further modified through the use of coagulants that may include such solvents as alcohols and solvent/nonsolvent mixtures. However, the most often used coagulant is water or mixtures of water with solvents, surfactants and salts.

The anisotropic membranes of this invention are uniquely suited for preparation of composite and multicomponent gas separation membranes. These membranes can be advantageously prepared by solution coating methods. Examples of such methods are shown in U.S. Pat. Nos. 5,076,916; 4,840,819; 4,826,599; 4,756,932 and 4,467,001. The coating is deposited onto the discriminating layer of the anisotropic substrate and in some embodiments can partially or completely occlude the pores. The coating material, the coating morphology and coating thicknesses can be selected by those skilled in the art to meet the needs of specific gas separation applications. Coating layers of less that 1500 Å in thickness are generally employed, and preferred dense ultra-fine coatings as thin as 500 Å or less can be successfully formed on the surfaces of the blend membranes of this invention by solution deposition methods.

A broad range of solvents can be utilized in the preparation of coated membranes. The preferred solvents include aliphatic hydrocarbons including cycloaliphatic hydrocarbons, such as hexane, heptane and cyclohexane; alcohols such as ethanol, isopropanol and their mixtures with water; certain chlorinated hydrocarbons, in particular 1,1,1-trichloroethane and its mixtures with 1,2-dichloropropane and cyclohexane; organic acids such as acetic acid and in particular its mixtures with alcohols and water; mixtures of aromatic hydrocarbons with aliphatic hydrocarbons or with 1,1,1-trichloroethane; ketones, in particular mixtures of methyl ethyl ketone with alcohols and cyclohexane.

In one embodiment of this invention, high surface porosity hollow fibers (i.e. hollow fibers with high discriminating layer porosity) are advantageously produced from blends of polyetherimide and phenylindane containing polyimides. Such membranes can be utilized directly in fluid separation applications, such as ultrafiltration, or as substrates for the manufacturing of composite fluid separation membranes. In one embodiment, hollow fibers are coated with high gas permeability materials. These coated membranes may be useful for gas and vapor separation applications such as oxygen enrichment or organic vapor removal from air. Coating materials that can be advantageously employed to prepare composite membranes of this type include siloxanes, such as polydimethyl siloxane, polybutadiene and ethylene-propylene-diene monomer (EPDM) rubbers and the like. In another embodiment, it may be desirable to coat the high surface porosity hollow fibers with a high gas separation factor, glassy polymer, which to a large extent determines the gas separation characteristics of the composite membrane. Examples of such materials include sulfonated polyarylethers, sulfonated poly(phenylene oxides), polyesters, polyestercarbonates, and cellulosic derivative polymers, such as cellulose acetate and blends of cellulose acetate with poly(-methyl methacrylate) to name a few. Detailed descriptions of chemical structure and preparation methods for some of these materials can be found in U.S. Pat. Nos. 5,071,498; 5,055,114; 4,994,095; 4,971,695; 4,919,865; and 4,874,401. These composite membranes are most suitable for air separation applications, acid gas separations, or hydrogen/methane separations. Composite membranes such as these can occasionally have minor defects that can be further repaired by post-treatment methods with solvents and dilute solutions of polymers and reactive additives. Post-treatment procedures of this type are taught by Bikson et al. in U.S. Pat. Nos. 4,767,422 and 5,131,927.

In another embodiment of this invention, low discriminating layer porosity hollow fiber membranes are produced from blends of polyetherimide and phenylindane containing polyimide. Such membranes can be utilized directly for fluid separations or further coated prior to use. In some embodiments such as gas separation applications, the dry-wet spun hollow fiber membranes can be dried by air drying or other prior art processes prior to use. For example, membranes spun into water baths can be dehydrated by methods shown in U.S. Pat. Nos. 4,080,743 and 4,120,098. In another embodiment it may be desirable to overcoat these membranes with a high gas permeability material, such as silicone rubber, to repair residual defects in the membrane separation layer prior to use. High gas permeability, low separation factor elastomeric coatings are frequently used to repair minor defects that occur in highly asymmetric low surface porosity membranes. Preparation of such multicomponent gas separation membranes is described in U.S. Pat. No. 4,230,463. In other cases, it may be advantageous to coat these low surface porosity hollow fibers with high gas separation factor materials that contribute to the overall gas separation characteristics of the composite membrane. These high gas separation factor materials are frequently glassy polymers. Representative examples of such polymers include polyesters, polyestercarbonates, sulfonated polysulfones and sulfonated poly(phenylene oxides), cellulosic derivative polymers, such as cellulose acetate or blends of cellulose acetate with poly(methyl methacrylate) to name a few. Coating of these glassy polymers onto low surface porosity hollow fibers often yields an essentially defect-free composite gas separation membrane with an attractive combination of permeation and separation characteristics.

Processes for spinning polyetherimide are well known in the art and some examples have been cited. These processes generally require injection of a liquid bore medium in order to keep hollow fiber bores open during the spinning process. These fluids generally consist of solvents, solvent/nonsolvent mixtures or a swelling agent for the membrane forming material. Bore fluids frequently can adversely effect final membrane properties. For example, bore fluids often cause undue densification of porous walls or increase thickness of the membrane discriminating layer. If the discriminating layer is desired at the exterior hollow fiber surface, the mild coagulating bore fluids can lead to unwanted barrier layers at the interior wall of the hollow fiber bore. Thus, it is frequently advantageous to spin hollow fibers with an inert, noncoagulating bore medium such as a gas. The addition of phenylindane containing polyimide to polyetherimide based spin dopes was found to be beneficial in this regard. Even minor amounts of phenylindane containing polyimide, when admixed with polyetherimide to form spin dopes of this invention, were found to enhance the spinnability of the solution such that a hollow fiber could be formed by injecting air rather than a solvent into the nascent fiber bore.

It is believed that blends of polyetherimide and phenylindane containing polyimides of this invention are miscible. This notion is supported by the fact that Ultem ® 1000/Matrimid ® 5218 blends exhibit a single glass transition temperature when examined by differential scanning calorimetry. The measured glass transition temperature of the blend is dependent on the blends composition and will increase in proportion to Matrimid concentration in the blend. Thus, a single glass transition temperature at 246° C. was measured for the 50/50 blend (by weight). This temperature is in between the glass transition temperature of Ultem and Matrimid polymers measured at 220° C. and 330° C., respectively. However, a definitive mechanism by which these polymer blends serve to produce improved membranes of this invention is not precisely known. The following examples will serve to illustrate the utility of this invention, but should not be construed as limiting.

EXAMPLE 1

A spinning solution was prepared by mixing 38 parts of a polyetherimide resin (Ultem ® 1000), 2 parts of phenylindane containing polyimide (Mattimid ® 5218), 10 parts of Triton ® X100, 12.5 parts of gamma-butyrolactone, and 37.5 parts of N-methyl pyrrolidone. The solution was subsequently deaerated, filtered, and pumped through a tube-in-orifice spinnerette having an orifice diameter of 0.140 cm and an injection tube outside diameter of 0.102 cm at a rate of 3.7 cc/min and at a temperature of 74° C. A stream of dry air was delivered to the core of the injection tube. The spinnerette was completely enclosed in a vacuum chamber in which the vacuum level was maintained at 14 cm Hg. The hollow filament stream travelled through the vacuum chamber for a distance of 5.1 cm, whereupon it entered the top of a coagulation column that consisted substantially of a solution of 0.05% Triton X100 in water, and was then drawn at 30.5 m/min through a quench bath consisting of essentially a 0.05% aqueous solution of Triton X100 maintained at 45° C.

The resulting hollow fibers had an outside diameter of 0.042 cm and an inside diameter of 0.017 cm. The fibers were washed with a 90/10 V/V mixture of isopropanol/water to remove residual solvent and nonsolvent components and dried.

EXAMPLE 2

Composite membranes were prepared by coating dry hollow fibers prepared as described in Example 1 with a 6% solution of a polydimethyl siloxane polymer (Sylgard ® 184 admixed with 10% of crosslinking catalyst, manufactured by Dow Chemical Co.) in cyclohexane. The residual cyclohexane was removed by drying, and the thusly formed composite membrane was fabricated into modules containing 8 hollow fibers about 40.5 cm long. These membrane modules were tested for air separation characteristics at a pressure of 7.03 Kg/cm² at 25° C. and close to zero percent stage cut. The composite membrane exhibited an oxygen permeation rate, $O_2P/t$ of $53 \times 10^{-6}$ cm³/cm².cmHg.sec and an $O_2/N_2$ separation factor of 2.3.

EXAMPLE 3

A spin dope consisting of 36 parts of Ultem 1000, 2 parts of Matrimid 5218, 31 parts of gamma-butyrolactone, and 31 parts of N-methyl pyrrolidone was spun into hollow fibers. The spin dope was pumped through a tube-in-orifice spinnerette with an orifice diameter of 0.152 cm and an injection tube outside diameter of 0.064 cm at a rate of 6.3 cc/min and at a temperature of 93° C. A stream of dry air was delivered through the core of the spinnerette injection tube. The spinnerette was completely enclosed in a vacuum chamber in which the vacuum level was maintained at 14 cm Hg. The hollow filament stream traveled through the vacuum chamber for a distance of 10.2 cm, whereupon it entered the top of a coagulation column that consisted substantially of a 0.05% Triton X100 solution in water and was then drawn at 61 m/min through a quench bath that consisted essentially of a 0.05% aqueous solution of Triton X100 maintained at 45° C.

Thus prepared hollow fibers, which had an outside diameter of 0.041 cm and an inside diameter of 0.015 cm, were washed and dried as described in Example 1.

Comparative Example 4 (not part of present invention)

A spinning solution was prepared by mixing 38.5 parts of Ultem 1000, 30.75 parts of gamma-butyrolactone, and 30.75 parts of N-methyl pyrrolidone until a homogeneous mixture was obtained. This solution was spun into hollow fibers.

Unlike the fibers described in the previous examples, this formulation could not be spun by metering air into the fiber bore but required a liquid medium injection into the spinnerette injection tube in order to produce a hollow fiber. The spin dope was pumped at a rate of 6.1 cc/min through a tube-in-orifice spinnerette having an orifice diameter of 0.102 cm and an injection tube outside diameter of 0.051 cm. The spin dope was extruded at a temperature of 71° C., while a stream of N-methyl pyrrolidone was metered through the injection tube to produce a nascent hollow fiber. The spinnerette was completely enclosed in a vacuum chamber in which the vacuum level was maintained at 14 cm Hg. The hollow filament stream traveled through the vacuum chamber for a distance of 5.1 cm whereupon it entered the top of a coagulation column and was subsequently drawn at 67.1 m/min through a quench bath consisting essentially of water at 45° C. Thus prepared asymmetric hollow fibers, which had an outside diameter of 0.038 cm and an inside diameter of 0.019 cm were washed and dried as described in Example 1.

These dried hollow fibers were coated with a 6% solution of polydimethyl siloxane in cyclohexane (Sylgard ® 184 admixed with 10% crosslinking catalyst). The residual cyclohexane was removed by drying, and thusly formed multicomponent membrane was fabricated into modules containing 8 hollow fibers about 40.5 cm long. These membrane modules were tested for air separation characteristics at pressure of 7.03 kg/cm², 25° C. and close to zero percent stage cut. The multicomponent membrane exhibited an oxygen permeation rate, $O_2$ P/t of $3.4 \times 10^{-6}$ cm³/cm².cmHg.sec and an $O_2/N_2$ separation factor of 3.8.

EXAMPLE 5

Hollow fibers prepared as described in Example 3 were coated, dried, and tested for air separation characteristics following the procedures described in Example 4. The multicomponent membrane prepared following the method of this invention exhibited an oxygen permeation rate, $O_2$ P/t of $17 \times 10^{-6}$ cm³/cm².cmHg.sec, and an $O_2/N_2$ separation factor of 5.3. Thus, the multicomponent membranes prepared from the blend of polyetherimide and phenylindane containing polyimide according to the method of this invention had significantly improved permeation rates and gas separation factors than the multicomponent membranes prepared from polyetherimide only.

EXAMPLE 6

Substrate hollow fibers were prepared in accordance with the techniques described above using a blend of Ultem and Matrimid in a 95:5 ratio. A composite membrane was then prepared by solution coating the hollow fibers with poly(methyl methacrylate)/cellulose acetate blend of 50:50 weight ratio. Preparation of poly(methyl methacrylate)/cellulose acetate composite membranes is disclosed in U.S. Pat. No. 4,919,865 incorporated herein by reference. A solution of 0.2% solids was applied to the hollow fibers at a coating rate of about 15 m/min. Thusly formed composite membranes were fabricated into a module containing 8 hollow fibers about 40.5 cm long. These modules were tested for helium and nitrogen permeation utilizing pure gases at a pressure of about 7.0 kg/cm² and a temperature of 25° C. The composite membrane exhibited a helium permeation rate of $18 \cdot 10^{-5}$ cm³ (STP)/cm².cmHg.sec, and a helium/nitrogen separation factor of about 210.

What is claimed is:

1. A fluid separation membrane comprising the blend of polyetherimide and phenylindane containing polyimide, wherein the weight ratio of said phenylindane containing polyimide to said polyetherimide is less than 0.2 and wherein said fluid separation membrane contains a discriminating layer that is less than 1000 Å thick.

2. The membrane of claim 1 wherein said polyetherimide has the following repeat unit:

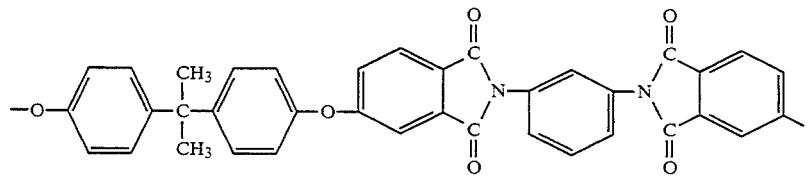

and wherein said phenylindane containing polyimide has the following repeat unit:

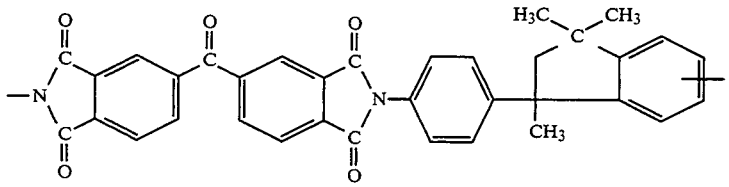

3. The membrane of claim 2 wherein the ratio of phenylindane containing polyimide to polyetherimide is less than 0.08.

4. The membrane of claim 2 wherein said membrane is configured as a hollow fiber.

5. The membrane of claim 4 wherein said hollow fiber membrane is spun with a gaseous fluid injected into fiber bores.

6. The membrane of claim 1 wherein said discriminating layer is less than 500 Å thick.

7. The membrane of claim 2 wherein said fluid separation membrane is a gas separation membrane.

8. The membrane of claim 7 and including an additional layer of a gas separation material superimposed over said discriminating layer to form a composite gas separation membrane, wherein said gas separation material contributes to the gas separation characteristics of said composite membrane.

9. The membrane of claim 8 wherein said gas separation material is a polydimethyl silxoane, polybutadiene or ethylene-propylene-diene monomer rubber.

10. The membrane of claim 8 wherein said gas separation material is sulfonated polysufone, sulfonated poly(phenylene oxide), polyester, polyestercarbonate, or a blend of cellulose acetate and poly(methyl methacrylate).

11. A highly anisotropic fluid separation membrane prepared by the process comprising:

(a) forming a mixture of polyetherimide and phenylindane containing polyimide, and at least one solvent, wherein the weight ratio of said phenylindane containing polyimide to polyetherimide in said mixture is less than 0.2;

(b) extruding the mixture in the form of a hollow fiber into a gaseous atmosphere maintained at a subatmospheric pressure;

(c) conveying into and solidifying the extruded mixture in a liquid medium;

(d) washing the solidified fiber; and (e) recovering the solidified highly anisotropic hollow fiber membrane, wherein said anisotropic fluid separation membrane contains a discriminating layer that is less than 1000 Å thick.

12. A highly anisotropic hollow fiber membrane of claim 11 wherein said discriminating layer is less than 500 Å thick.

13. The fluid separation membrane of claim 11 wherein said discriminating layer has a surface porosity of below $10^{-5}$.

14. The fluid separation membrane of claim 13 wherein such discriminating layer is treated to block residual imperfections.

15. The hollow fiber membrane of claim 11 wherein said mixture further includes at least one nonsolvent for said polyetherimide and phenylindane containing polyimide polymers.

16. The fluid separation membrane of claim 11 including a layer of gas separation material deposited over said discriminating layer to form a composite gas separation membrane, wherein said gas separation material contributes to gas separation characteristics of said composite membrane.

17. The fluid separation membrane of claim 16 wherein said gas separation material is sulfonated polysulfone, sulfonated poly(phenylene oxide), polyester or polyestercarbonate, or a blend of cellulose acetate and poly(methyl methacrylate).

18. The fluid separation membrane of claim 17 wherein said polyetherimide has the following repeat unit:

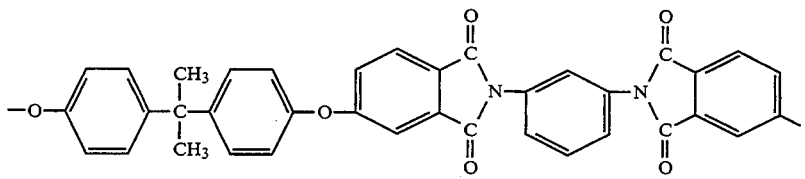

and wherein said phenylindane-containing polyimide has the following repeat unit:

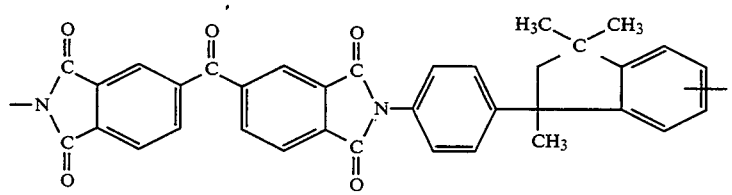

and wherein the ratio of said polyetherimide to said phenylindane-containing polyimide is at least 4:1 by weight.

19. The separation membrane of claim 18 wherein said layer of gas separation material is less than 1500 Å thick.

* * * * *